US007069441B2

(12) United States Patent
Balaz et al.

(10) Patent No.: US 7,069,441 B2
(45) Date of Patent: *Jun. 27, 2006

(54) VPN ENROLLMENT PROTOCOL GATEWAY

(75) Inventors: Rudolph Balaz, Redmond, WA (US);
Victor W. Heller, Issaquah, WA (US);
Xiaohong Su, Issaquah, WA (US);
Keith R. Vogel, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/946,280

(22) Filed: Sep. 21, 2004

(65) Prior Publication Data

US 2005/0039055 A1    Feb. 17, 2005

Related U.S. Application Data

(63) Continuation of application No. 09/548,257, filed on Apr. 12, 2000, now Pat. No. 6,978,364.

(51) Int. Cl.
*H04L 9/00* (2006.01)

(52) U.S. Cl. .................. 713/175; 713/155; 713/176; 713/179; 726/14

(58) Field of Classification Search .................. None
See application file for complete search history.

(56) References Cited

U.S. PATENT DOCUMENTS

| 5,473,599 | A  | 12/1995 | Li et al. |
| 5,495,411 | A  | 2/1996  | Ananda |
| 5,548,645 | A  | 8/1996  | Ananda |
| 5,638,513 | A  | 6/1997  | Ananda |
| 5,699,431 | A  | 12/1997 | Van Oorschot et al. |
| 5,983,270 | A  | 11/1999 | Abraham et al. |
| 6,035,402 | A  | 3/2000  | Vaeth et al. |
| 6,044,471 | A  | 3/2000  | Colvin |
| 6,308,277 | B1 | 10/2001 | Vaeth et al. |
| 6,385,731 | B1 | 5/2002  | Ananda |
| 6,438,690 | B1 | 8/2002  | Patel et al. |
| 6,606,744 | B1 | 8/2003  | Mikurak |
| 6,671,813 | B1 | 12/2003 | Ananda |
| 6,697,824 | B1 | 2/2004  | Bowman-Amuah |
| 6,715,073 | B1 | 3/2004  | An et al. |
| 2004/0177246 | A1 | 9/2004 | Balaz et al. |
| 2004/0177281 | A1 | 9/2004 | Balaz et al. |

OTHER PUBLICATIONS

"About Security", netit.financial-net.com/argonne/index/secure_modern_argonne.html p. 1-4.
"Cisco System's Simple Certificate Enrollment Protocol" 1998 Cisco System Inc. p. 1-34.

(Continued)

*Primary Examiner*—Christopher Revak
(74) *Attorney, Agent, or Firm*—Lee & Hayes, PLLC

(57) ABSTRACT

A virtual private network (VPN) enrollment protocol gateway is described herein. The protocol gateway is implemented as a registration authority that operates as an intermediary between routers and a certificate authority, allowing routers operating in accordance with one protocol to obtain and maintain certificates for a VPN from a certificate authority operating in accordance with another protocol. In accordance with one aspect, the gateway protocol supports various requests from the router, including router enrollment requests, get certificate revocation list request, get certificate requests, get certificate authority certificate requests, and password requests.

5 Claims, 11 Drawing Sheets

OTHER PUBLICATIONS

"PKCS #7: Cryptographic Message Syntax Standard" An RSA Laboratories Technical Note Version 1.5 Revised Nov. 1, 1993 pp. 1-30 (RSA ata Security Inc. Public-Key Cryptography Standars (PKCS)).

"Smart Card Enrollement Control Usage Scenario", http://msdn.microsoft.com Jan. 2000 2 pages.

Auerbach, A Protocol Conversion Software Tookit' 1989 ACM p. 259-270.

Housley et al., "Standards Track" Jan. 1999 pp. 1-129.

Smart Card Enrollment Control Methods; Http://msdn.microsoft.com, Jan. 2000 2 pages.

PKCS #10: Certification Request Syntax Standard, RSA Laboratories, Version 1.0, Nov. 1993, pp. 1-7 (RSA Data Security, Inc. Public-Key Cryptography Standards (PKCS)).

222 ↘

| 228 ↘ | 230 ↘ |
|---|---|
| Router Transaction ID (1) | Certificate Authority Request ID (1) |
| Router Transaction ID (2) | Certificate Authority Request ID (2) |
| ⋮ | ⋮ |
| Router Transaction ID (*n*) | Certificate Authority Request ID (*n*) |

| 232 ↘ | 234 ↘ |
|---|---|
| Certificate Authority Request ID (1) | Hash of Request (1) |
| Certificate Authority Request ID (2) | Hash of Request (2) |
| ⋮ | ⋮ |
| Certificate Authority Request ID (*m*) | Hash of Request (*m*) |

| 236 |
|---|
| Password (1) |
| Password (2) |
| ⋮ |
| Password (*x*) |

*Fig. 6*

VPN ENROLLMENT PROTOCOL GATEWAY

RELATED APPLICATIONS

This is a continuation of application Ser. No. 09/548,257, filed Apr. 12, 2000, now U.S. Pat. No. 6,978,364, entitled "VPN Enrollment Protocol Gateway", which is hereby incorporated by reference herein.

TECHNICAL FIELD

This invention relates to secure communications, and more particularly to a protocol gateway allowing routers operating in accordance with one protocol to obtain and maintain certificates for a virtual private network (VPN) from a certificate authority operating in accordance with another protocol.

BACKGROUND OF THE INVENTION

Computer technology is continually advancing, resulting in continually evolving uses for computers. One such use is communicating with other computers over a network, such as the Internet, to obtain or exchange information, purchase or sell goods or services, etc. One particular type of communication that can be established is referred to as a "virtual private network" or "VPN". In a VPN, portions of a network (such as the Internet) are used to establish secure communications from one computer to another via multiple different routers in the network. The VPN allows users to use the larger network (e.g., the Internet) to connect to another computer as if they were part of a dedicated secure network.

In order to operate as part of a VPN, a router enrolls for a VPN certificate via a certificate authority (CA). This VPN certificate is then provided to other routers that are part of the VPN and is used to authenticate the router and may also be used to securely communicate with the other routers. However, different protocols for enrolling for VPN certificates have arisen, many of which are incompatible with one another. For example, many routers available from Cisco Systems, Inc. of San Jose, Calif. use a proprietary protocol called Simple Certificate Enrollment Protocol (SCEP) for obtaining VPN certificates, while many certificate authorities available from Microsoft Corporation of Redmond, Wash. use an incompatible enrollment protocol based on Public-Key Cryptography Standard (PKCS) #10 and PKCS #7. Thus, a router using SCEP would not be able to enroll for a VPN certificate from a CA using PKCS #10 and PKCS #7.

Additionally, many routers and CAs are already manufactured and in use that operate based on such incompatible protocols. Therefore, re-designing such routers or CAs to be compatible with one another would require the replacement of many such pre-existing devices. Thus, it would be beneficial to provide a solution that allows routers and CAs (including pre-existing routers and CAs) operating based on incompatible protocols to communicate with one another for VPN certificate enrollment.

The VPN enrollment protocol gateway described below addresses these and other disadvantages.

SUMMARY OF THE INVENTION

A virtual private network (VPN) enrollment protocol gateway is described herein. The protocol gateway allows routers operating in accordance with one protocol to obtain and maintain certificates for a VPN from a certificate authority operating in accordance with another protocol.

According to one aspect, the VPN enrollment protocol gateway is implemented as a registration authority that operates as an intermediary between the router and the certificate authority. As a registration authority, the gateway is trusted by the certificate authority. The router communicates with the registration authority as if it were the certificate authority, not realizing that it is communicating with an intermediary.

According to another aspect, the protocol gateway receives a router enrollment request from the router. The protocol gateway decrypts the request, adds an alterative subject name to the request, digitally signs the request, and forwards the signed request to the certificate authority. The certificate authority determines whether to trust the source of the request (the protocol gateway), and proceeds to respond with the requested certificate if it verifies that the gateway can be trusted. The gateway receives the requested certificate, encrypts and digitally signs a response including the certificate, and returns the signed and encrypted response to the router.

According to another aspect, the certificate authority may not be able to immediately issue a certificate, in which case it issues a pending response. The registration authority maintains a mapping of a router transaction ID (identifier) received from the router and a pending response ID received from the certificate authority. This mapping allows subsequent requests from the router with the same transaction ID (e.g., querying whether the certificate has been issued yet) to be properly matched to a request previously submitted to the certificate authority for which a pending response was issued. The registration authority also maintains a mapping of a hash value of the request received from the router to the pending response for that request. This mapping allows the registration authority to determine when a request is resubmitted by the router (e.g., in the event the router never receives a pending response returned to it by the registration authority).

According to another aspect, the protocol gateway receives a get certificate revocation list from the router. The protocol gateway decrypts the request and extracts from the request the certificate serial number of the signing certificate of the request. The protocol gateway then submits a Get Certificate by Serial Number request to the certificate authority, which returns to the protocol gateway the certificate corresponding to the serial number. The protocol gateway extracts a certificate revocation list distribution point from the response, and obtains the certificate revocation list from the distribution point. The protocol gateway then generates a response including the certificate revocation list, encrypts and signs the response, and returns the response to the router.

According to another aspect, the protocol gateway receives a get certificate request from the router. The protocol gateway decrypts the request and extracts from the request the certificate serial number of the signing certificate of the request. The protocol gateway then submits a Get Certificate by Serial Number request to the certificate authority, which returns to the protocol gateway the certificate corresponding to the serial number. The protocol gateway then encrypts and signs a response including the certificate, and returns the response to the router.

According to another aspect, the protocol gateway receives a get certificate authority certificate request from the router. The protocol gateway generates a response message including the signing certificate of the registration authority as well as the encryption certificate of the registration authority, and returns the response message to the router.

According to another aspect, the protocol gateway maintains a record of passwords handed out to a router. A router obtains a password by communicating with the protocol gateway (or another device trusted by the protocol gateway) via an authenticatable mechanism (e.g., SSL (Secure Sockets Layer)). A password is returned to the router, which can then use this password for a request submitted to the protocol gateway. If the password presented by the router is in the router's record, then the request is processed; otherwise, the request is rejected.

BRIEF DESCRIPTION OF THE DRAWINGS

The present invention is illustrated by way of example and not limitation in the figures of the accompanying drawings. The same numbers are used throughout the figures to reference like components and/or features.

FIG. 4 shows an exemplary transaction ID table in accordance with certain embodiments of the invention.

FIG. 5 shows an exemplary request hash table in accordance with certain embodiments of the invention.

FIG. 6 shows an exemplary password table in accordance with certain embodiments of the invention.

DETAILED DESCRIPTION

The discussion herein assumes that the reader is familiar with cryptography. For a basic introduction of cryptography, the reader is directed to a text written by Bruce Schneier and entitled "Applied Cryptography: Protocols, Algorithms, and Source Code in C," published by John Wiley & Sons with copyright 1994 (or second edition with copyright 1996).

In the discussion below, embodiments of the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that various embodiments of the invention may be practiced with other computer system configurations, including hand-held devices, multiprocessor systems, microprocessor-based or programmable consumer electronics, network PCs, minicomputers, mainframe computers, and the like. In a distributed computer environment, program modules may be located in both local and remote memory storage devices.

Alternatively, embodiments of the invention can be implemented in hardware or a combination of hardware, software, and/or firmware. For example, all or part of the invention can be implemented in one or more application specific integrated circuits (ASICs).

Figure 1:
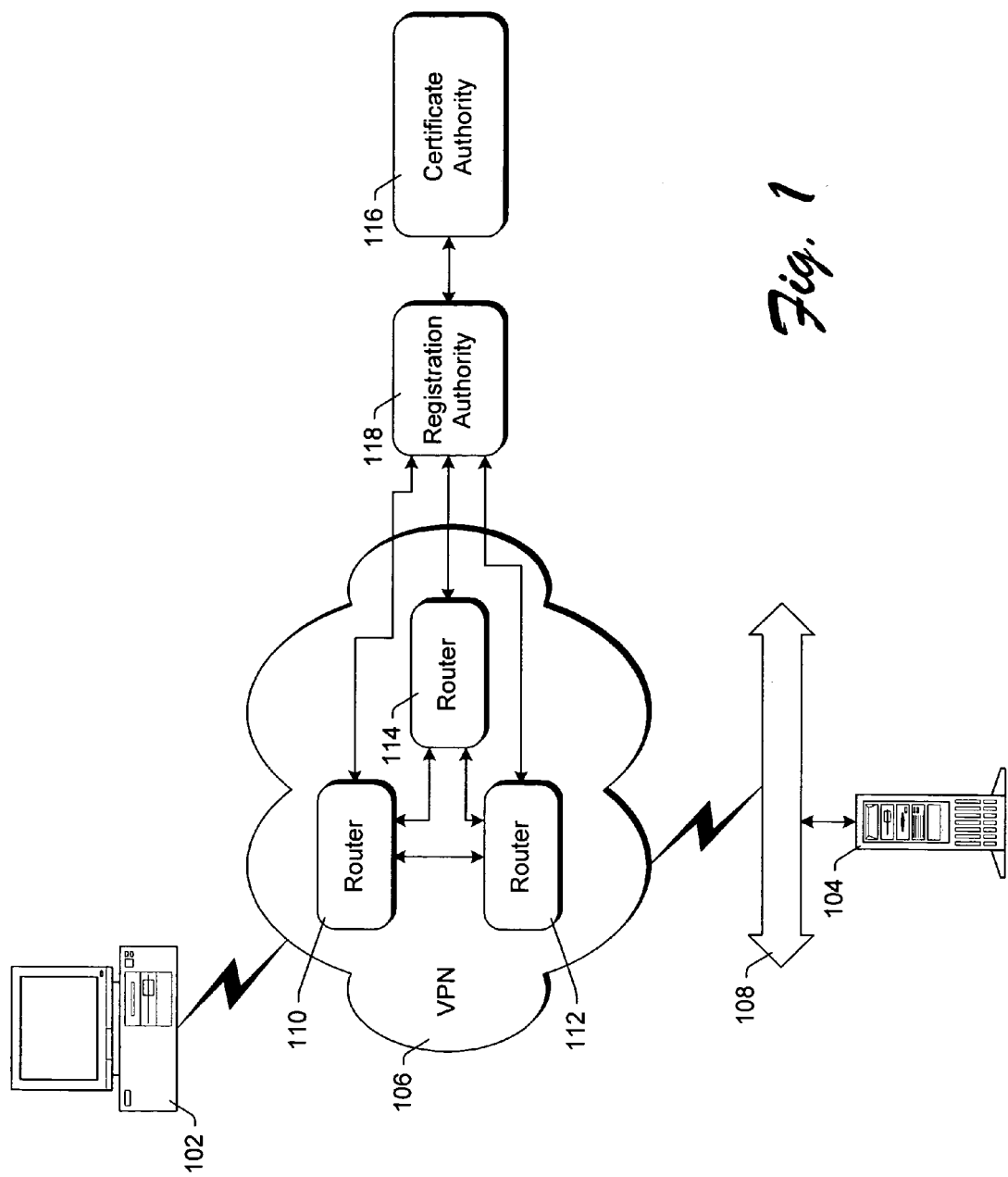
FIG. 1 shows a virtual private network environment with an enrollment protocol gateway in accordance with certain embodiments of the invention.

FIG. 1 shows a virtual private network environment with an enrollment protocol gateway in accordance with certain embodiments of the invention. Generally, one or more client computers 102 can communicate with one or more server computers 104 via a public network supporting a conventional virtual private network (VPN) 106. Server computers 104 can be coupled directly to the network supporting VPN 106, or alternatively can be coupled to the network supporting VPN 106 via another network, such as local area network (LAN) 108.

VPN 106 includes one or more routers 110, 112, and 114 through which data is passed between client 102 and server 104. Routers 110–114 are part of a public network, such as the Internet. Routers that are part of other types of networks may also be included in VPN 106, such as routers from a LAN or a private wide-area network.

Additionally, other networks may be involved in the communication between client 102 and server 104. By way of example, client 102 may connect to the public network supporting VPN 106 via a conventional modem and a Public Switched Telephone Network (PSTN), via a conventional cable modem and cable lines, etc.

Routers 110–114 can communicate with one another, as well as registration authority 118, via any of a wide variety of conventional communications protocols. In one implementation, routers 110–114 communicate with one another and registration authority 118 using the Hypertext Transfer Protocol (HTTP).

Each of the routers 110–114 receives data from one of the other routers 110–114 or alternatively from another component (e.g., a public network access provider, such as an Internet Service Provider (ISP); client computer 102; etc.). The data is then securely passed on to another of the routers 110–114 or other components.

In order for data to be transmitted among routers 110–114, a certificate-based authentication scheme is employed. In such an authentication scheme, each router 110–114 is assigned a unique certificate that it can use to authenticate itself to other routers or other computing devices (e.g., an ISP, a bridge or gateway, etc.). Additionally, these other computing devices may be part of VPN 106 and may similarly be assigned unique certificates that can be used for authentication. Such certificates can also optionally be used to encrypt messages between routers and/or other computing devices in any of a variety of conventional manners. For ease of explanation, routers are described as the devices that are obtaining and maintaining certificates for VPN 106. The establishment and operation of a VPN is well-known to those skilled in the art, and thus will not be discussed further except as it pertains to the invention.

The certificates used by routers 110–114 are assigned by a trusted certificate authority (CA) 116. The process of obtaining such a certificate is referred to as "enrollment". In the illustrated example, routers 110–114 use a different enrollment protocol than is used by certificate authority 116. A registration authority 118 communicates with both routers 110–114 and certificate authority 116 and acts as an intermediary for enrollment, translating requests and responses in one protocol to another, as discussed in more detail below.

Figure 2:
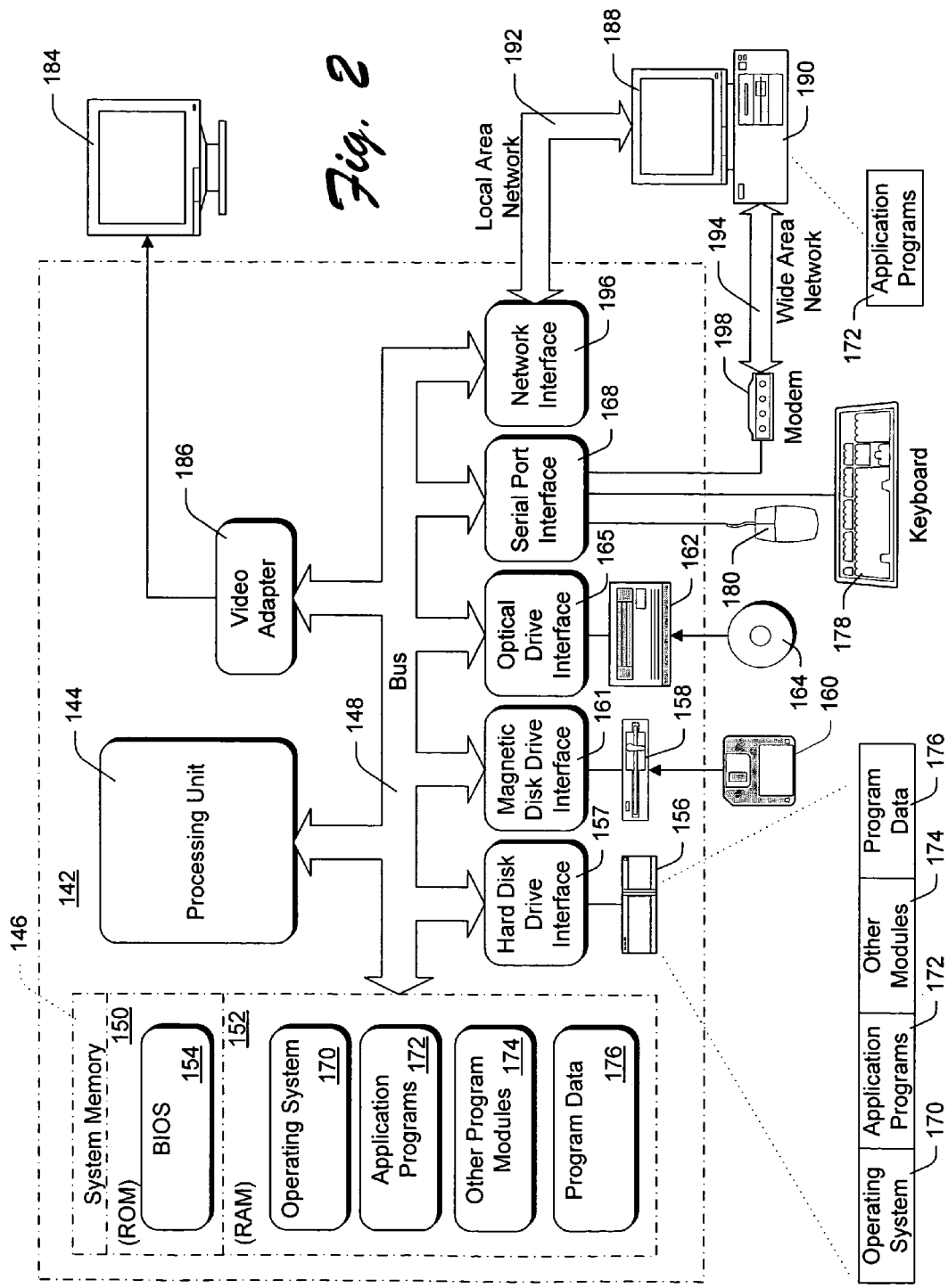
FIG. 2 shows a general example of a computer that can be used in accordance with certain embodiments of the invention.

FIG. 2 shows a general example of a computer 142 that can be used in accordance with certain embodiments of the invention. Computer 142 is shown as an example of a computer that can perform the functions of a client computer 102, a server computer 104, a certificate authority 116, or a registration authority 118 of FIG. 1. Computer 142 includes one or more processors or processing units 144, a system memory 146, and a bus 148 that couples various system components including the system memory 146 to processors 144.

The bus 148 represents one or more of any of several types of bus structures, including a memory bus or memory controller, a peripheral bus, an accelerated graphics port, and a processor or local bus using any of a variety of bus architectures. The system memory includes read only memory (ROM) 150 and random access memory (RAM) 152. A basic input/output system (BIOS) 154, containing the basic routines that help to transfer information between elements within computer 142, such as during start-up, is stored in ROM 150. Computer 142 further includes a hard disk drive 156 for reading from and writing to a hard disk, not shown, connected to bus 148 via a hard disk driver interface 157 (e.g., a SCSI, ATA, or other type of interface); a magnetic disk drive 158 for reading from and writing to a removable magnetic disk 160, connected to bus 148 via a magnetic disk drive interface 161; and an optical disk drive 162 for reading from or writing to a removable optical disk 164 such as a CD ROM, DVD, or other optical media, connected to bus 148 via an optical drive interface 165. The drives and their associated computer-readable media provide nonvolatile storage of computer readable instructions, data structures, program modules and other data for computer 142. Although the exemplary environment described herein employs a hard disk, a removable magnetic disk 160 and a removable optical disk 164, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 160, optical disk 164, ROM 150, or RAM 152, including an operating system 170, one or more application programs 172, other program modules 174, and program data 176. Operating system 170 can be any of a variety of operating systems, such as any of the "Windows" family of operating systems available from Microsoft Corporation of Redmond, Wash. A user may enter commands and information into computer 142 through input devices such as keyboard 178 and pointing device 180. Other input devices (not shown) may include a microphone, joystick, game pad, satellite dish, scanner, or the like. These and other input devices are connected to the processing unit 144 through an interface 168 (e.g., a serial port interface) that is coupled to the system bus. A monitor 184 or other type of display device is also connected to the system bus 148 via an interface, such as a video adapter 186. In addition to the monitor, personal computers typically include other peripheral output devices (not shown) such as speakers and printers.

Computer 142 can operate in a networked environment using logical connections to one or more remote computers, such as a remote computer 188. The remote computer 188 may be another personal computer, a server, a router, a network PC, a peer device or other common network node, and typically includes many or all of the elements described above relative to computer 142, although only a memory storage device 190 has been illustrated in FIG. 2. The logical connections depicted in FIG. 2 include a local area network (LAN) 192 and a wide area network (WAN) 194. Such networking environments are commonplace in offices, enterprise-wide computer networks, intranets, and the Internet. In the described embodiment of the invention, remote computer 188 executes an Internet Web browser program such as the "Internet Explorer" Web browser manufactured and distributed by Microsoft Corporation of Redmond, Wash.

When used in a LAN networking environment, computer 142 is connected to the local network 192 through a network interface or adapter 196. When used in a WAN networking environment, computer 142 typically includes a modem 198 or other means for establishing communications over the wide area network 194, such as the Internet. The modem 198, which may be internal or external, is connected to the system bus 148 via a serial port interface 168. In a networked environment, program modules depicted relative to the personal computer 142, or portions thereof, may be stored in the remote memory storage device. It will be appreciated that the network connections shown are exemplary and other means of establishing a communications link between the computers may be used.

Generally, the data processors of computer 142 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described herein. The invention includes such sub-components when they are programmed as described. In addition, the invention described herein includes data structures, described herein, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Figure 3:
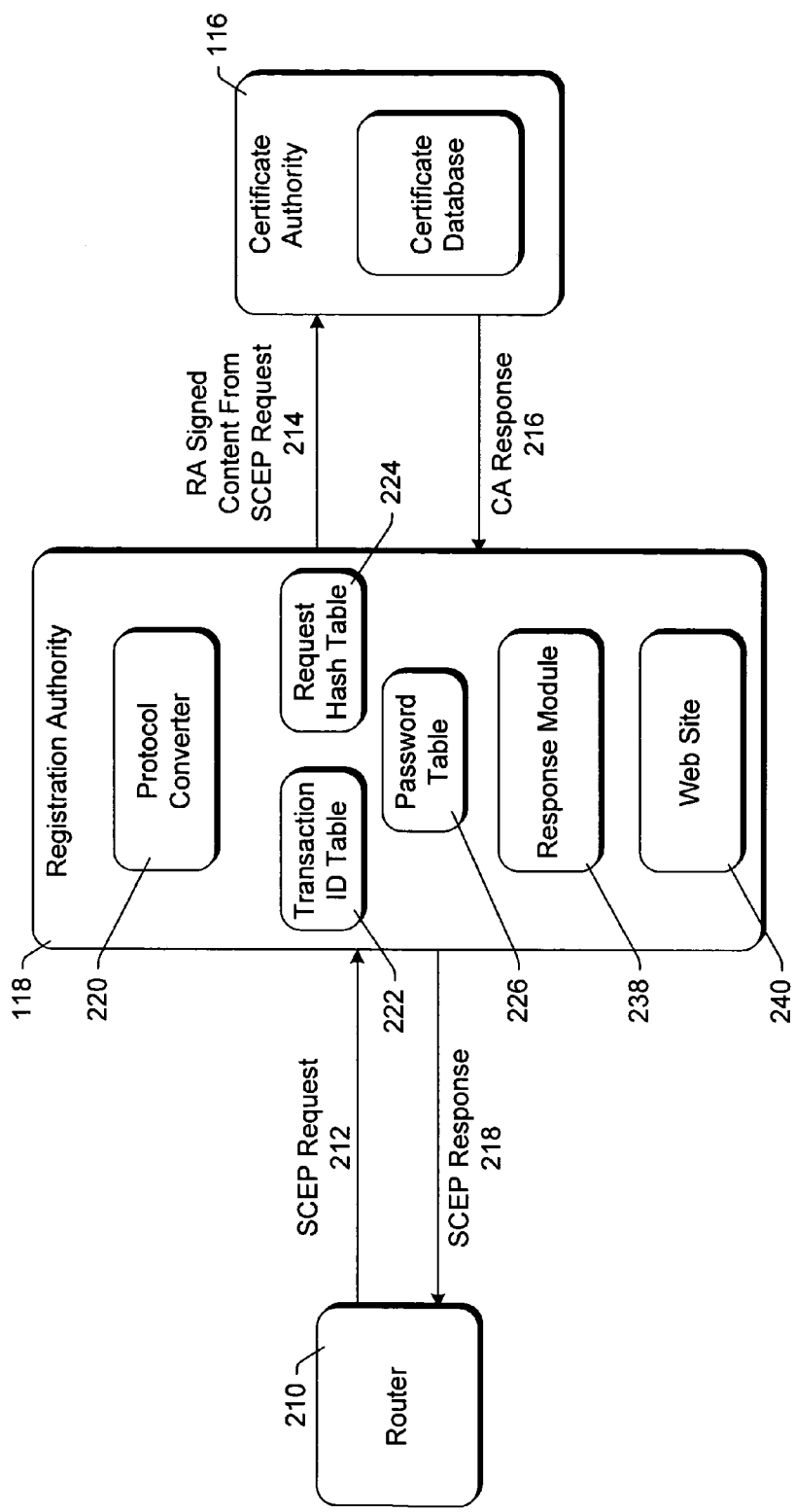
FIG. 3 is a block diagram illustrating a registration authority operating as a protocol gateway between a router and a certificate authority in accordance with certain embodiments of the invention.

FIG. 3 is a block diagram illustrating an exemplary registration authority 118 operating as a protocol gateway between a router 210 and a certificate authority 116. Router 210 can be, for example, any of routers 110–114 of FIG. 1. Router 210 is configured (e.g., during an installation or setup process) with the address of registration authority 118 rather than CA 116 as the certificate authority. In the illustrated example, router 210 has no other knowledge that it is communicating with registration authority 118 rather than certificate authority 116.

Communication between registration authority 118 and each of router 210 and certificate authority 116 can be carried out using any of a wide variety of conventional encryption and/or digital signing techniques. By way of example, using well-known public key cryptography techniques, a device obtains a private key/public key pair; the public key is made available to other devices while the private key is kept secret by the device. Another device can encrypt a message intended for this device by using a conventional encryption algorithm and this device's public key. The private key/public key pair and the encryption algorithm are chosen such that it is relatively easy to decrypt the message with the private key, but extremely difficult to decrypt the message without the private key. Similarly, a message can be digitally signed by the device using a conventional encryption algorithm and its private key. The digitally signed message can be decrypted by another device using the public key, allowing the other device to verify that the message came from that device. Alternatively, rather than applying an encryption algorithm to the message itself, the encryption algorithm may be applied to a hash value generated based on the message and a known hash function. Different public key/private key pairs can be used for encryption and digital signatures, or alternatively the same public key/private key pair can be used for both encryption and digital signatures.

Registration authority 118 operates as an enrollment agent for certificate authority 116, allowing routers such as router 210 to enroll for a VPN certificate from certificate authority 116 via registration authority 118. Registration authority 118 obtains, from certificate authority 116, an enrollment agency signature certificate (e.g., by enrolling for an "Offline IPSec" enrollment agent signature certificate) and an encryption certificate (e.g., by enrolling for an "IPSec Encryption" certificate). In the illustrated examples, these certificates are used by registration authority 118 to digitally sign data sent to both the router 210 and the certificate authority 116, and to encrypt data sent to the router 210.

Router 210 communicates requests 212 to registration authority 118 in accordance with the protocol supported by router 210. In the illustrated example, router 210 supports the protocol SCEP. Different types of requests 212 can be transmitted to registration authority 118. In one implementation, registration authority 118 operates as a protocol gateway for the following types of requests: router enrollment, get certificate revocation list (CRL), get certificate, get certificate authority (CA) certificate, and password registration. The specific manner in which each of these requests is handled by registration authority 118 is discussed in more detail below.

Upon receipt of an SCEP request 212, registration authority 118 converts the request into an appropriate format for certificate authority 116. The converted request is then digitally signed by registration authority 118 and the signed request 214 is transmitted to certificate authority 116. Certificate authority 116, receiving a request in its own protocol (using PKCS #7 and PKCS #10), responds to the request and issues a CA response 216. Registration authority 118 receives the response 216, converts the response to the appropriate SCEP format for router 210, and transmits an SCEP response 218 to router 210. Alternatively, for some requests registration authority 118 may generate the response 218 without forwarding a signed request 214 to certificate authority 116.

Registration authority 118 includes a protocol converter 220. Protocol converter 220 receives messages from router 210 and converts them as necessary to the proper protocol for certificate authority 116, and similarly receives messages from certificate authority 116 and converts them to the proper protocol for router 210. The manner in which protocol converter 220 operates is dependent on the particular protocols being used by router 210 and certificate authority 116.

In one implementation, registration authority 118 operates in accordance with the Internet X.509 Public Key Infrastructure Certificate and CRL Profile (Network Working Group Request for Comments 2459, Jan. 1999). Alternatively, other implementations may operate in accordance with other standards.

Registration authority 118 also includes a transaction ID table 222, a request hash table 224, and a password table 226. Tables 222–226 are used by registration authority 118 to maintain information regarding requests 212 and responses 216 in order to conform with the protocols of router 210 and certificate authority 116.

FIG. 4 shows an exemplary transaction ID table in accordance with certain embodiments of the invention. Transaction ID table 222 maintains a mapping of router transaction IDs 228 to CA request IDs 230. A router transaction ID 228 is received by registration authority 118 from router 210 as part of each router enrollment message. Similarly, when certificate authority 116 returns a pending response to registration authority 118, the pending response includes a CA request ID 230 (also referred to as a "token"). Transaction ID table 222 allows registration authority 118 to query certificate authority 116 for the correct certificate in response to subsequent requests from router 210 for the certificate the pending response was issued for, as discussed in more detail below.

Each entry in transaction ID table 222 is removed from table 222 after a period of time. In one implementation, each entry in table 222 is kept in table 222 for one week and then removed. This period of time can optionally be configurable by a user or administrator.

FIG. 5 shows an exemplary request hash table in accordance with certain embodiments of the invention. Request hash table 224 maintains a mapping of certificate authority request IDs 232 to hash values of the requests 234. The hash value of a request is generated using any of a variety of conventional hashing functions, such as MD5 (Message Digest 5). A hash function is a mathematical function that, given input data (e.g., the request) generates a unique output hash value based on the input data. Thus, the hash value uniquely identifies a request but requires less storage space than maintaining all of the request. Alternatively, table 224 could maintain the actual request rather than hash values of the request.

Request hash table 224 allows registration authority 118 to "remember" router requests. For example, a pending response may be issued by registration authority 118 to router 210, as discussed in more detail below. If a failure or problem occurs during the transmission (e.g., a network failure), then the pending response may not be received by router 210. If router 210 never receives the response, router 210 will re-issue the same request. By maintaining table 224, registration authority 118 can determine when a received request is a re-issued request, and need not submit another request for another new certificate to certificate authority 116.

Each entry in request hash table 224 is removed from table 224 after a period of time. In one implementation, each entry in table 224 is kept in table 224 for twenty minutes and then removed. This period of time can optionally be configurable by a user or administrator.

FIG. 6 shows an exemplary password table in accordance with certain embodiments of the invention. Password table 226 maintains passwords 236 that are issued to router 210 in a secure manner. Such passwords can subsequently be used by router 210 to obtain a certificate, providing verification of the identity of router 210.

Each password in password table 226 is removed from table 226 after a period of time. In one implementation, each password in table 226 is kept in table 226 for sixty minutes and then removed. This period of time can optionally be configurable by an administrator.

Returning to FIG. 3, in the illustrated example registration authority 118 is a dynamically linked library (DLL) referred to as the "MSCEP" DLL. Alternatively, registration authority 118 may include a DLL referred to as the "MSCEP" DLL. Registration authority 118 includes a response module 238 that generates responses for certain requests from router 210 that do not require forwarding to certificate authority 116. The operation of response module 238 is discussed in more detail below.

Registration authority 118 further hosts a web site 240. Alternatively, registration authority 118 may have a secure communication link to a server hosting web site 240, thereby allowing data to be securely passed between the server and registration authority 118, or registration authority 118 may be software and/or firmware being executed by a server that also hosts web site 240. Web site 240 allows passwords to be securely issued to router 210 and stored in password table 226, as discussed in more detail below.

Router Enrollment Request

Figure 7A:
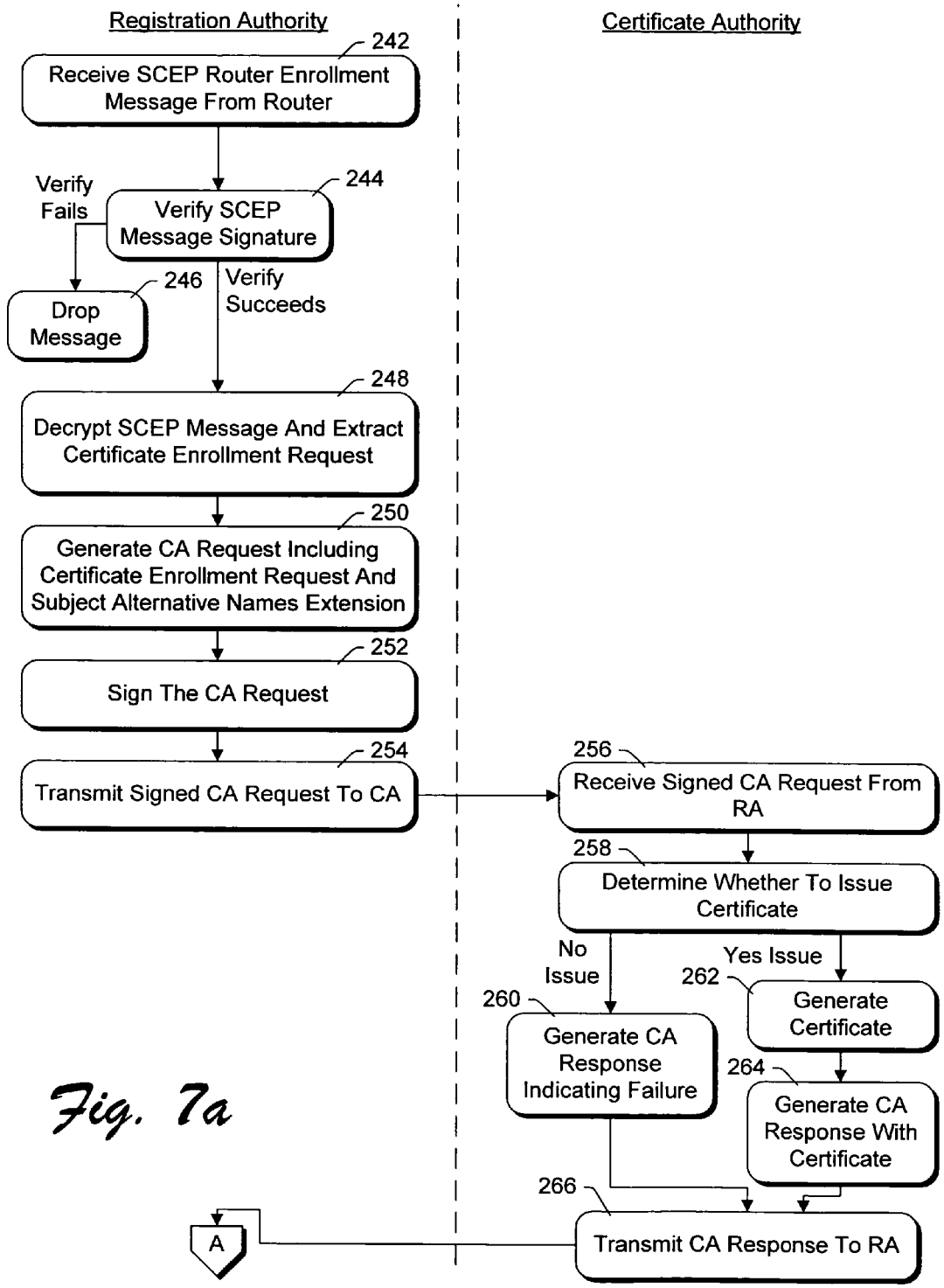
FIGS. 7a and 7b are a flowchart illustrating an exemplary process for handling a router enrollment request in accordance with certain embodiments of the invention.
Figure 7B:
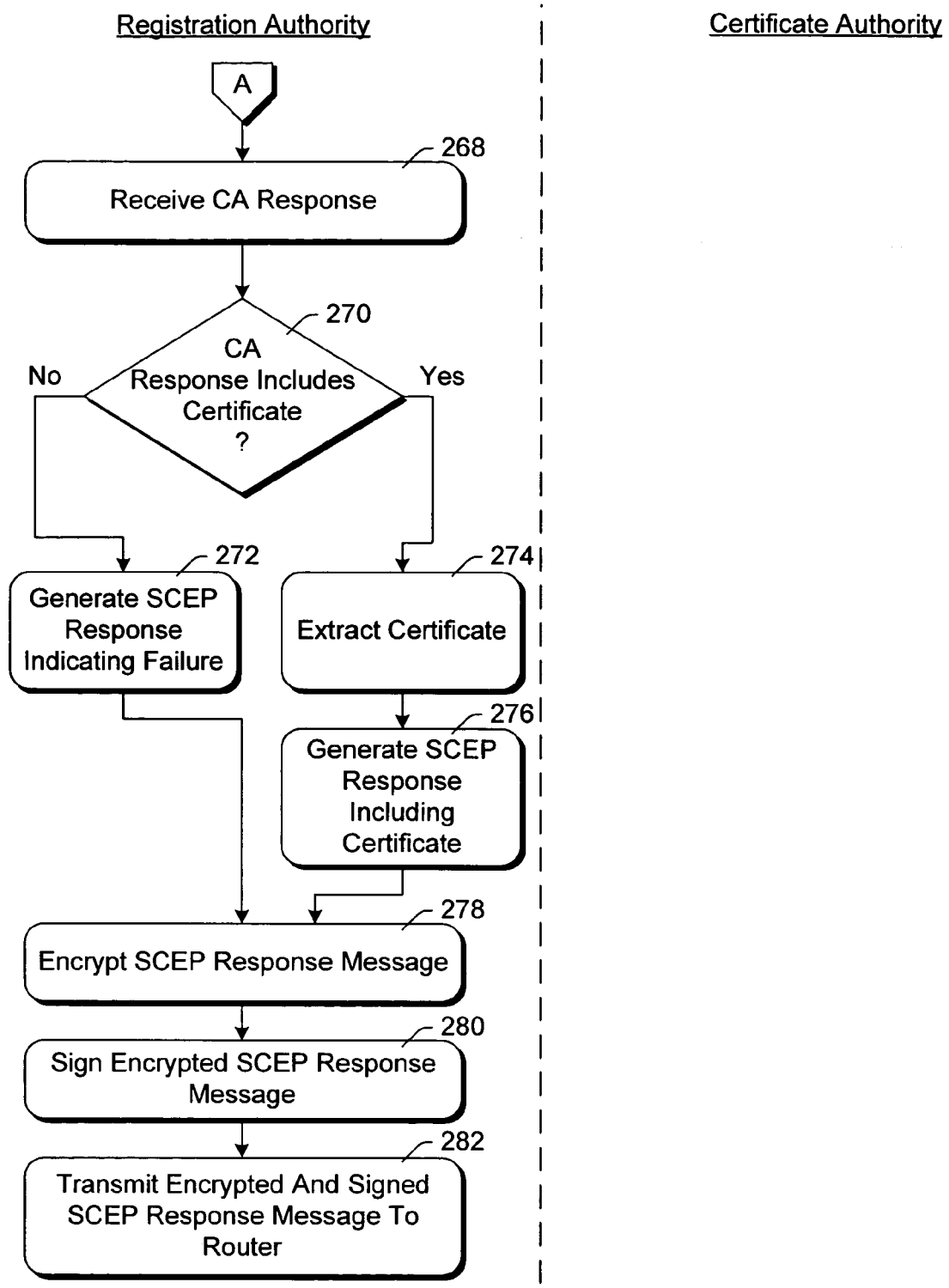

FIGS. 7a and 7b are a flowchart illustrating an exemplary process for handling a router enrollment request in accordance with certain embodiments of the invention. Acts on the left-hand side of FIGS. 7a and 7b are implemented by registration authority 118 of FIG. 3, while acts on the right-hand side are implemented by certificate authority 116. The process of FIGS. 7a and 7b may be performed in software, firmware, hardware, or a combination thereof. FIGS. 7a and 7b are described with additional reference to components in FIG. 3.

To participate in a VPN, router 210 enrolls for a certificate from certificate authority 116. Router 210 enrolls for a certificate by sending, as SCEP request 212, a router enrollment message (e.g., a SCEP PKCSReq message) to registration authority 118. The router enrollment message includes a certificate enrollment request in accordance with the Public-Key Cryptography Standards (PKCS) #10 standard. The certificate enrollment request is further encrypted (e.g., using the public key of registration authority 118) and then digitally signed by router 210 in accordance with the Public-Key Cryptography Standards (PKCS) #7 standard. Additional information regarding PKCS #7 and PKCS #10 is available from RSA Data Security, Inc. of Bedford, Mass. It should be noted that, although requests from router 210 use PKCS #7 and PKCS #10, certain information needed by certificate authority 116 is not included in the requests. Registration authority 118 resolves this problem, adding information when necessary.

Registration authority 118 receives, as the router enrollment message, this encrypted and digitally signed request (act 242). Upon receipt of the enrollment message, registration authority 118 verifies the signature of the router enrollment message (act 244). If the signature is not verified then the message is ignored (act 246). Alternatively, an indication of failure could be returned to router 210.

If the signature is verified, then registration authority 118 decrypts the router enrollment message (e.g., using the private key of registration authority 118) and extracts the certificate enrollment request from the message (act 248). Registration authority 118 uses the certificate enrollment request to generate a request to the CA for an enrollment certificate in a format expected by certificate authority 116 (act 250).

Router 210 needs a certificate with a subject alternative names extension (SubjectAltName). However, router 210 does not specifically request the SubjectAltName extension, and certificate authority 116 does not automatically add the extension. Registration authority 118 resolves this issue by adding, to the message it transmits to certificate authority 116, the SubjectAltName extension in the request.

The PKCS #7 message, including both the subject alternative names extension and the certificate enrollment request extracted from the router enrollment message, is digitally signed by registration authority 118 (act 252). This signed message is then transmitted to certificate authority 116 as a CA request (act 254). Note that the CA request thus includes a PKCS #7 message that is signed by registration authority 118, which in turn includes a certificate enrollment request that is signed by router 210.

Certificate authority 116 receives the CA request from registration authority 118 (act 256) and determines, based on the content of the CA request, whether to issue the requested certificate (act 258). The manner in which certificate authority 116 determines whether to issue the requested certificate can vary. In one implementation, certificate authority 116 determines whether to issue a certificate based on whether the certificate of the registration authority 118 can be validated up to a trusted valid root and whether the certificate of registration authority 118 includes an extended key usage indicating that registration authority 118 can be a registration authority (and thus operate as an enrollment agent). If both of these conditions are satisfied, then a certificate is issued. Otherwise, the certificate is not issued. Additionally, certificate authority 116 may require that the certificate of registration authority 118 have been issued directly by a certificate authority (that is, no intermediate certificates in the chain from the registration authority certificate to the certificate authority certificate).

If certificate authority 116 determines it will not issue a certificate, then certificate authority 116 generates a CA response indicating failure (act 260). However, if certificate authority 116 determines it will issue a certificate, then certificate authority 116 generates the requested certificate (act 262) and then generates a CA response including the generated certificate (act 264).

The CA response generated by certificate authority 116 has no message content and is referred to as a "degenerated PKCS #7". The PKCS #7 message, however, allows multiple certificates to be included in a degenerated PKCS #7 message. Certificate authority 116 returns the newly generated certificate as part of the degenerated PKCS #7 message. Additionally, the entire certificate chain from the generated certificate up to a root certificate may optionally be included in the degenerated PKCS #7 message.

Certificate authority 116 then transmits the CA response (indicating either failure or with the generated certificate) to registration authority 118 (act 266). Registration authority 118 receives the CA response (act 268) and checks whether the CA response includes a certificate (act 270). If no certificate is included, then registration authority 118 generates an SCEP response message indicating failure (act 272). However, if such a certificate is included, then registration authority 118 extracts the certificate (act 274) and generates an SCEP response including the certificate (act 276). In the illustrated example, registration authority 118 extracts only the certificate generated by certificate authority 116; the additional certificate chain (if included) is not used by registration authority 118. Alternatively, the entire certificate chain could be included if router 210 desired (or at least could handle) the chain.

Registration authority 118 then encrypts the SCEP response (act 278) and digitally signs the encrypted response (act 280). The encrypted and signed response is then transmitted to router 210 (act 282), which in turn can verify the signature and decrypt the response to extract the certificate generated by certificate authority 116.

Pending Response Handling

In some situations, certificate authority 116 may not immediately issue a CA response with either a certificate or an indication that no certificate will be issued. For example, certificate authority 116 may wait for an administrator to approve the issuing of the certificate. In such situations, certificate authority 116 issues a CA pending response from certificate authority 116.

Figure 8:
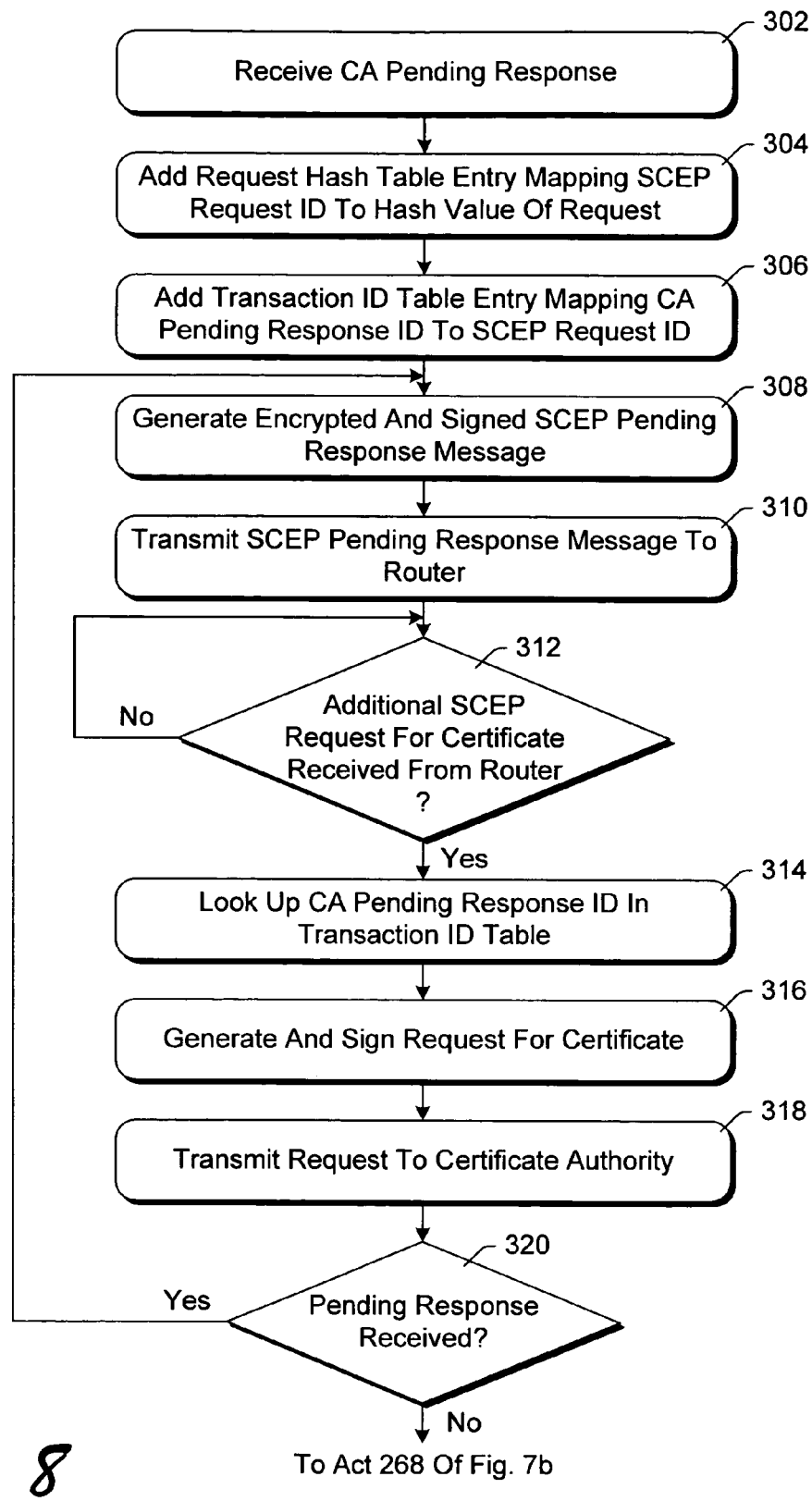
FIG. 8 is a flowchart illustrating an exemplary process for handling pending responses in accordance with certain embodiments of the invention.

FIG. 8 is a flowchart illustrating an exemplary process for handling pending responses in accordance with certain embodiments of the invention. The process of FIG. 8 is implemented by registration authority 118 of FIG. 3, and may be performed in software, firmware, hardware, or a combination thereof. FIG. 8 is described with additional reference to components in FIGS. 3–7b.

Registration authority 118 receives the CA pending response from certificate authority 116 (act 302). Upon receipt of the CA pending response, registration authority 118 adds entries to its transaction ID table 222 (act 304) and its request hash table 224 (act 306). Registration authority 118 also generates an encrypted and digitally signed SCEP pending response message (act 308) and transmits the encrypted and signed message to router 210 (act 310).

Typically, in response to an SCEP pending response message, router 210 will re-issue its request for a certificate (e.g., via a GetCertInitial message). Registration authority 118 waits until it receives an additional SCEP request for the certificate from the router 210 (act 312). Once the additional request is received, registration authority 118 accesses transaction ID table 222 to determine the appropriate CA request ID (act 314). Registration authority 118 uses the CA request ID from table 222 to generate a CA request for a certificate corresponding to the CA request ID and digitally signs the CA request (act 316). The signed CA request is then transmitted to certificate authority 116 (act 318).

Upon receiving the CA request, certificate authority 116 may issue another pending response to registration authority 118 or alternatively determine whether to issue the certificate (per act 258 of FIG. 7a discussed above). Upon receipt of a response from certificate authority 116, registration authority 118 determines whether the response is another pending response (act 320). If the response is another pending response, the registration authority 118 returns to act 308 and generates and encrypted and signed SCEP pending response message. However, if the response is not another pending response, then registration authority 118 proceeds per acts 268–282 of FIG. 7b to return an appropriate response to router 210.

Use of request hash table 224 further allows registration authority 118 to gracefully recover in the event the SCEP pending response message is not received by router 210. If router 210 does not receive the pending response message, then it will resubmit its original request (e.g., an SCEP PKCSReq message). In order to avoid a duplicate request to certificate authority for the certificate, registration authority 118 generates the hash value for SCEP PKCSReq messages it receives and compares the hash value to the entries in request hash table 224. If the hash value matches an entry, then registration authority 118 uses the CA request ID from table 224 to generate a CA request for a certificate corresponding to the CA request ID (act 316), rather than generating a CA request including a certificate enrollment request (act 250 of FIG. 7a). Processing then continues as discussed above with reference to FIG. 8.

Get Certificate Revocation List Request

Returning to FIG. 3, router 210 may also send a Get Certificate Revocation List (CRL) request as SCEP request 212. The request identifies a serial number or similar identifier of a certificate for which the corresponding CRL should be retrieved. The CRL is a list identifying revoked certificates which is made available by the certificate authority (typically in a public repository). The CRL can be checked to determine whether a particular serial number (typically identified in the CRL by its serial number) has been revoked. Registration authority 118 responds to such a request by obtaining the requested CRL and returning it to router 210.

Figure 9:
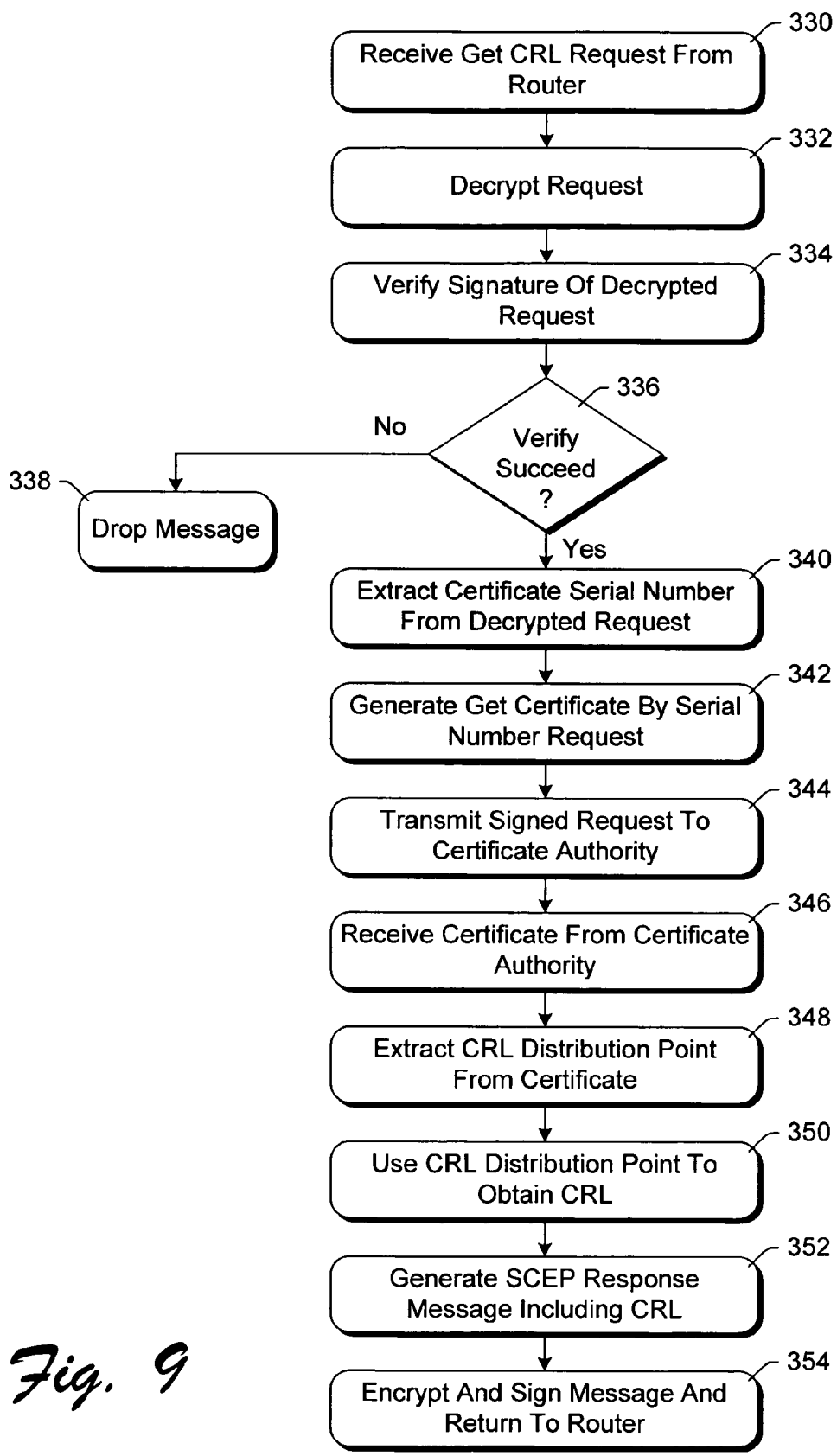
FIG. 9 is a flowchart illustrating an exemplary process for handling a Get Certificate Revocation List request in accordance with certain embodiments of the invention.

FIG. 9 is a flowchart illustrating an exemplary process for handling a Get Certificate Revocation List request in accordance with certain embodiments of the invention. The process of FIG. 9 is implemented by registration authority 118 of FIG. 3, and may be performed in software, firmware, hardware, or a combination thereof. FIG. 9 is described with additional reference to components in FIG. 3.

Initially, registration authority 118 receives the Get CRL request (e.g., an SCEP GetCRL message) from router 210 (act 330). Registration authority 118 decrypts the request (act 332), verifies the signature of the decrypted request (act 334), and proceeds based on whether the signature is verified (act 336). If the signature cannot be successfully verified, then the message is dropped (act 338); registration authority 118 simply ignores the message. Alternatively, registration authority 118 may return an indication to router 210 that the signature could not be verified.

However, if the signature is successfully verified, then registration authority 118 extracts the certificate serial number from the decrypted request (act 340). This serial number can be extracted by obtaining the serial number of the certificate used by router 210 to sign the Get CRL request.

Registration authority 118 then uses the extracted serial number to generate a Get Certificate by Serial Number request (act 342). The Get Certificate by Serial Number request is then digitally signed and transmitted to certificate authority 116 (act 344), which in turn accesses its records to identify the certificate corresponding to the given serial number. This certificate is then returned by certificate authority 116 to registration authority 118 (act 346).

The certificate returned by certificate authority 116 includes a CRL distribution point, which is an identifier of a location (e.g., a uniform resource locator (URL)) at which the CRL corresponding to the certificate can be obtained. Upon receipt of the certificate, registration authority 118 extracts the CRL distribution point from the certificate (act 348). Registration authority 118 then accesses (e.g., via HTTP) the identified location and retrieves the CRL located there (act 350).

Upon obtaining the CRL, registration authority 118 generates an SCEP response message including the CRL (act 352). Registration authority 118 then encrypts and digitally signs the SCEP response message including the CRL, and returns the encrypted and signed SCEP response message to router 210 (act 354).

Alternatively, the Get CRL request received from router 210 (act 330) may include the certificate for which the corresponding CRL is to be obtained. In this situation, the CRL distribution point can be extracted by accessing the included certificate, thereby alleviating the need to access certificate authority 116 (acts 340–346).

Get Certificate Request

Returning to FIG. 3, router 210 may also send a Get Certificate request as SCEP request 212. The request identifies a serial number of a certificate that the router would like returned to it. Router 210 may make such a request, for example, in situations where it has kept the serial number of a certificate it needs but has not kept the actual certificate. Registration authority 118 responds to such a request by obtaining the requested certificate and returning it to router 210.

Figure 10:
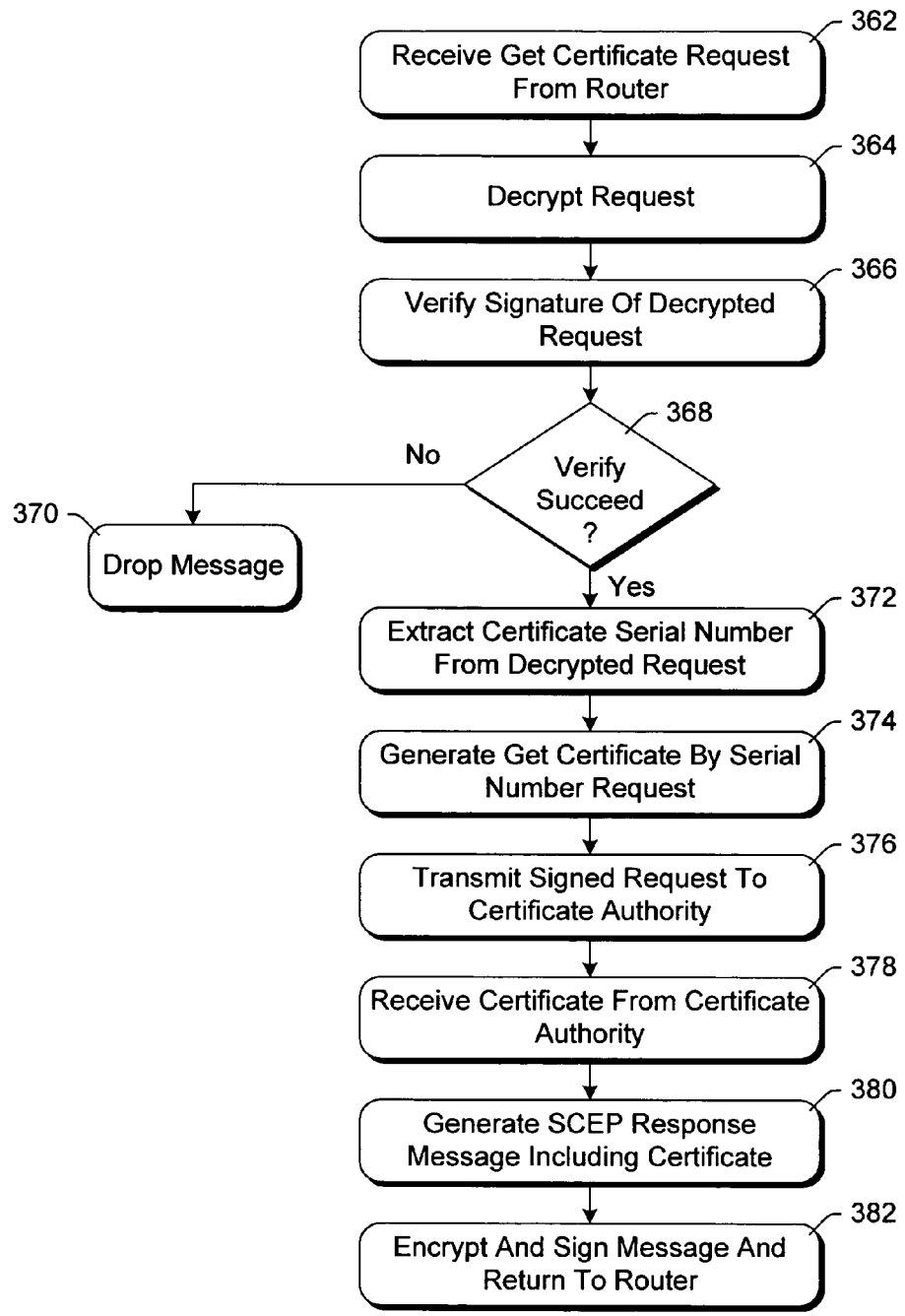
FIG. 10 is a flowchart illustrating an exemplary process for handling a Get Certificate request in accordance with certain embodiments of the invention.

FIG. 10 is a flowchart illustrating an exemplary process for handling a Get Certificate request in accordance with certain embodiments of the invention. The process of FIG. 10 is implemented by registration authority 118 of FIG. 3, and may be performed in software, firmware, hardware, or a combination thereof. FIG. 10 is described with additional reference to components in FIG. 3.

Initially, registration authority 118 receives the Get Certificate request (e.g., an SCEP GetCert message) from router 210 (act 362). Registration authority 118 decrypts the request (act 364), verifies the signature of the decrypted request (act 366), and proceeds based on whether the signature is verified (act 368). If the signature cannot be successfully verified, then the message is dropped (act 370); registration authority 118 simply ignores the message. Alternatively, registration authority 118 may return an indication to router 210 that the signature could not be verified.

However, if the signature is successfully verified, then registration authority 118 extracts the certificate serial number from the decrypted request (act 372). This serial number can be extracted by obtaining the serial number specified in the request (e.g., as the certificate serial number of the signing certificate of the request).

Registration authority 118 then uses the extracted serial number to generate a Get Certificate by Serial Number request (act 374). The Get Certificate by Serial Number request is then digitally signed and transmitted to certificate authority 116 (act 376), which in turn accesses its records to identify the certificate corresponding to the given serial number. This certificate is then returned by certificate authority 116 to registration authority 118 (act 378).

Registration authority 118 then generates an SCEP response message including the certificate received in act 378 (act 380). Registration authority 118 then encrypts and digitally signs the SCEP response message including the certificate, and returns the encrypted and signed SCEP response message to router 210 (act 382).

Get CA Request

Returning to FIG. 3, router 210 may also send a Get CA request as SCEP request 212. The request is an HTTP Get call to a URL hosted by registration authority 118. The URL is made available to router 210 during setup or configuration of router 210. Registration authority 118 responds to such a request by returning the requested certificates to router 210.

Figure 11:
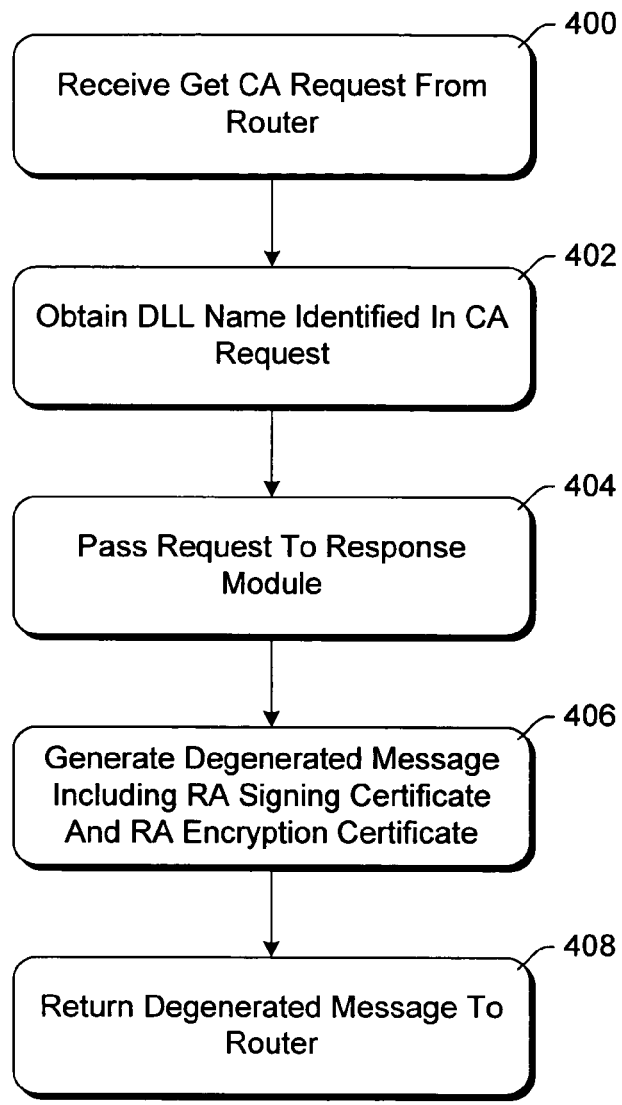
FIG. 11 is a flowchart illustrating an exemplary process for handling a Get Certificate Authority Certificate request in accordance with certain embodiments of the invention.

FIG. 11 is a flowchart illustrating an exemplary process for handling a Get Certificate Authority Certificate request in accordance with certain embodiments of the invention. The process of FIG. 11 is implemented by registration authority 118 of FIG. 3, and may be performed in software, firmware, hardware, or a combination thereof. FIG. 11 is described with additional reference to components in FIG. 3.

Initially, a Get CA request is received by registration authority 118 from router 210 (act 400). Upon receipt of the request, registration authority 118 obtains a DLL name identified by the request (act 402). In one implementation, an exemplary Get CA request from router 210 is in the following form:

```
GET mscep.dll/cgi-bin/
    pkiclient.exe?operation=GetCACert&message=<Base64
    encoded authority issuer identifier>
```

In this implementation, registration authority 118 is implemented as an IIS (Internet Information Server) ISAPI (Internet Server Application Programming Interface) DLL. Upon receipt of such a request, IIS parses the input through to identify the first DLL and attempts to load that DLL if necessary. Thus, the remainder of the request can be ignored by registration authority 118 in determining how to respond to the request.

Registration authority 118 is the identified DLL, which in the illustrated example is "mscep.dll", and passes the request to response module 238 (act 404). In response to being passed the message (either in its entirety, or a part thereof), response module 238 generates a degenerated PKCS #7 message including the signing certificate and the encryption certificate of registration authority 118 (act 406), and returns the degenerated PKCS #7 message to the router (act 408). Thus, router 210 requests the certificates for the certificate authority, but receives the certificates for the registration authority instead.

Alternatively, registration authority 118 may include a certificate chain in the message it generates in act 408. By way of example, MSCEP DLL 328 may send a certificate request to certificate authority 116, which returns the certificate of certificate authority 116 and a certificate chain that extends up to its root certificate.

Password Handling

Returning to FIG. 3, router 210 may also make use of a password to authenticate itself to certificate authority 116 (actually registration authority 118, but router 210 is not aware of this). The password allows registration authority 118 (and thus certificate authority 116, which trusts registration authority 118) to know that a particular request actually came from the router claiming to have sent it. The password may be used with one or more of the different types of SCEP requests 212 discussed above. By way of example, the password may be used with the router enrollment request.

Figure 12:
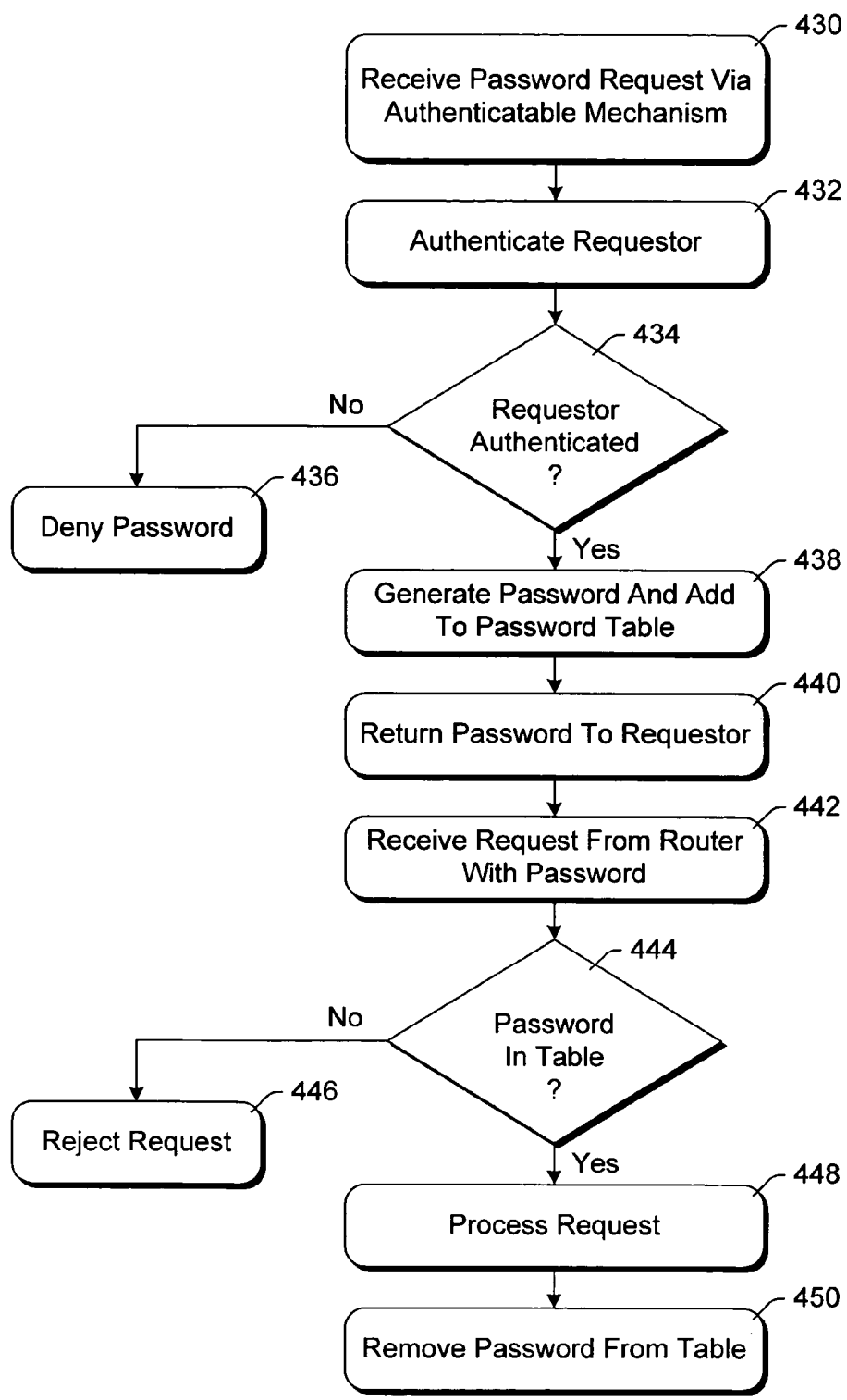
FIG. 12 is a flowchart illustrating an exemplary process for distributing and verifying passwords in accordance with certain embodiments of the invention.

FIG. 12 is a flowchart illustrating an exemplary process for distributing and verifying passwords in accordance with certain embodiments of the invention. The process of FIG. 12 is implemented by registration authority 118 of FIG. 3, and may be performed in software, firmware, hardware, or a combination thereof. FIG. 12 is described with additional reference to components in FIG. 3.

Initially, registration authority 118 receives a request for a password (act 430). This request is received via a mechanism that allows registration authority 118 to authenticate the requester, such as by use of SSL (Secure Sockets Layer) to authenticate the requestor when accessing web site 240 of FIG. 3. The requestor could be a computer being operated by a router administrator, or alternatively router 210. Upon receipt of the request, registration authority 118 attempts to authenticate the requester, such as the router administrator, (act 432) and proceeds based on whether the authentication is successful (act 434). If the requestor cannot be authenticated, then the request for a password is denied (act 436). The request may simply be ignored, or alternatively an indication may be returned to the requester that the request for a password is denied.

However, if the router is authenticated, then registration authority 118 proceeds to generate a password and add the newly generated password to password table 226 (act 438). The password can be generated by registration authority 118 in any of a wide variety of conventional manners, such as by generating a random (or pseudo-random) number and/or sequence of letters. The generated number may then be placed into a particular format if needed by either router 210 or certificate authority 116, such as hexadecimal format, binary coded decimal format, etc.

The password added to password table 226 is removed from table 226 after a period of time. In one implementation, each password in table 226 is kept in table 226 for sixty minutes and then removed. This period of time can optionally be configurable by an administrator.

Registration authority 118 then returns the newly generated password to requestor (act 440). This return of the password is done in a secure manner, such as by use of SSL.

Eventually, registration authority 118 receives a request from router 210 that includes a password that needs to be verified (act 442). Upon receipt of such a request, registration authority 118 determines whether the received password is in password table 226 (act 444). If the received password is not in password table 226, then the request is rejected (act 446). The request can simply be ignored, or alternatively a rejection response can be returned to router 210 (e.g., informing router 210 that the password it provided was not valid).

However, if the password is in password table 226, then the request is processed by registration authority 118 (act 448). Registration authority 118 may also optionally remove the password from password table 226 (act 450), thereby adding an additional level of security by allowing each password to be used only once.

CONCLUSION

Thus, a VPN enrollment protocol gateway has been described. The protocol gateway is implemented as a registration authority that is trusted by the certificate authority, and operates as an intermediary between the router and the certificate authority. The protocol gateway advantageously allows routers operating in accordance with one protocol to obtain and maintain certificates for a VPN from a certificate authority operating in accordance with another protocol.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A registration authority comprising:
    means for receiving, from a device, a first message in accordance with a first protocol, wherein the first message comprises an enrollment message;
    means for generating, based on the first message, a second message in accordance with a second protocol;
    means for sending the second message to a certificate authority;
    means for receiving, from the certificate authority, a third message in response to the second message and in accordance with the second protocol, wherein the third message comprises a certificate authority pending response;
    means for generating, based on the third message, a fourth message in accordance with the first protocol;
    means for sending the fourth message to the device as a response to the first message; and
    means for generating, in response to the certificate authority pending response:
        a hash value based on the enrollment message;
        a hash table entry mapping a pending response ID, corresponding to the certificate authority pending response, to the hash value; and
        a transaction ID table entry mapping the transaction ID, corresponding to the enrollment message, to a pending response ID corresponding to the certificate authority pending response.

2. A registration authority as recited in claim 1, wherein the device comprises a router.

3. A registration authority as recited in claim 1, wherein the means for generating the second message comprises:
    means for verifying that the first message has been digitally signed by the device;
    means for decrypting the first message;
    means for extracting a certificate enrollment request from the first message;
    means for generating a certificate authority request including the certificate enrollment request and a subject alternative names extension; and
    means for creating the second message by digitally signing the certificate authority request.

4. A registration authority as recited in claim 1, wherein the means for generating the fourth message comprises:
    means for generating a pending response;
    means for encrypting the pending response; and
    means for creating the fourth message by digitally signing the encrypted pending response.

5. A registration authority as recited in claim 1, further comprising:
    means for receiving an additional enrollment message from the device;
    means for generating a new hash value based on the additional enrollment message;
    means for checking whether an entry in the hash table matches the new hash value; and
    means for, if an entry in the hash table matches the new hash value,
        obtaining a pending response ID, from the hash table, corresponding to the new hash value, and
        transmitting, to the certificate authority, a certificate request including the pending response ID.

* * * * *